INVENTOR.
DAVID D. RECTOR
BY
*Curtis, Morris & Safford*
ATTORNEYS

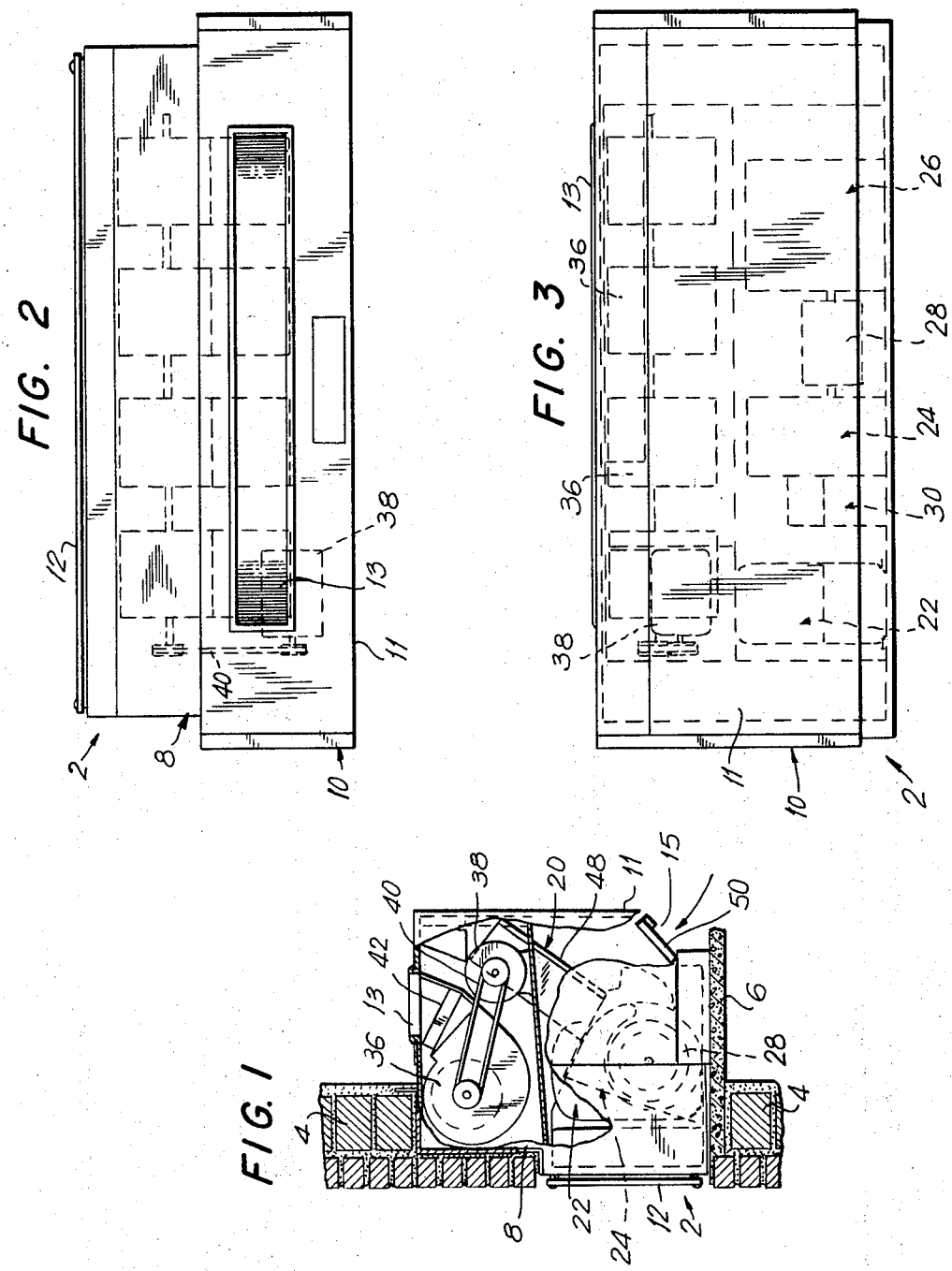

INVENTOR.
DAVID D. RECTOR
BY
Curtis, Morris & Safford
ATTORNEYS

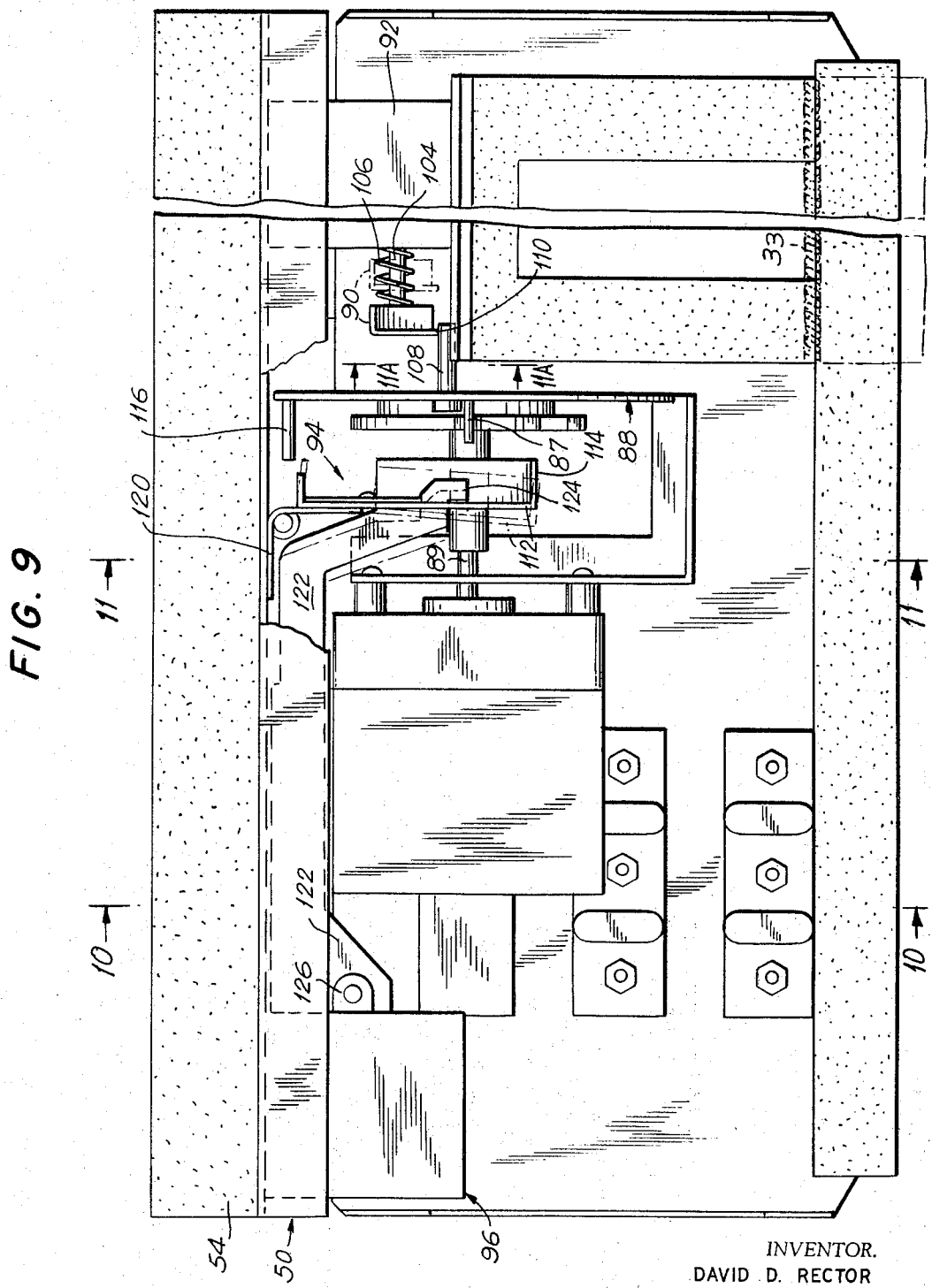

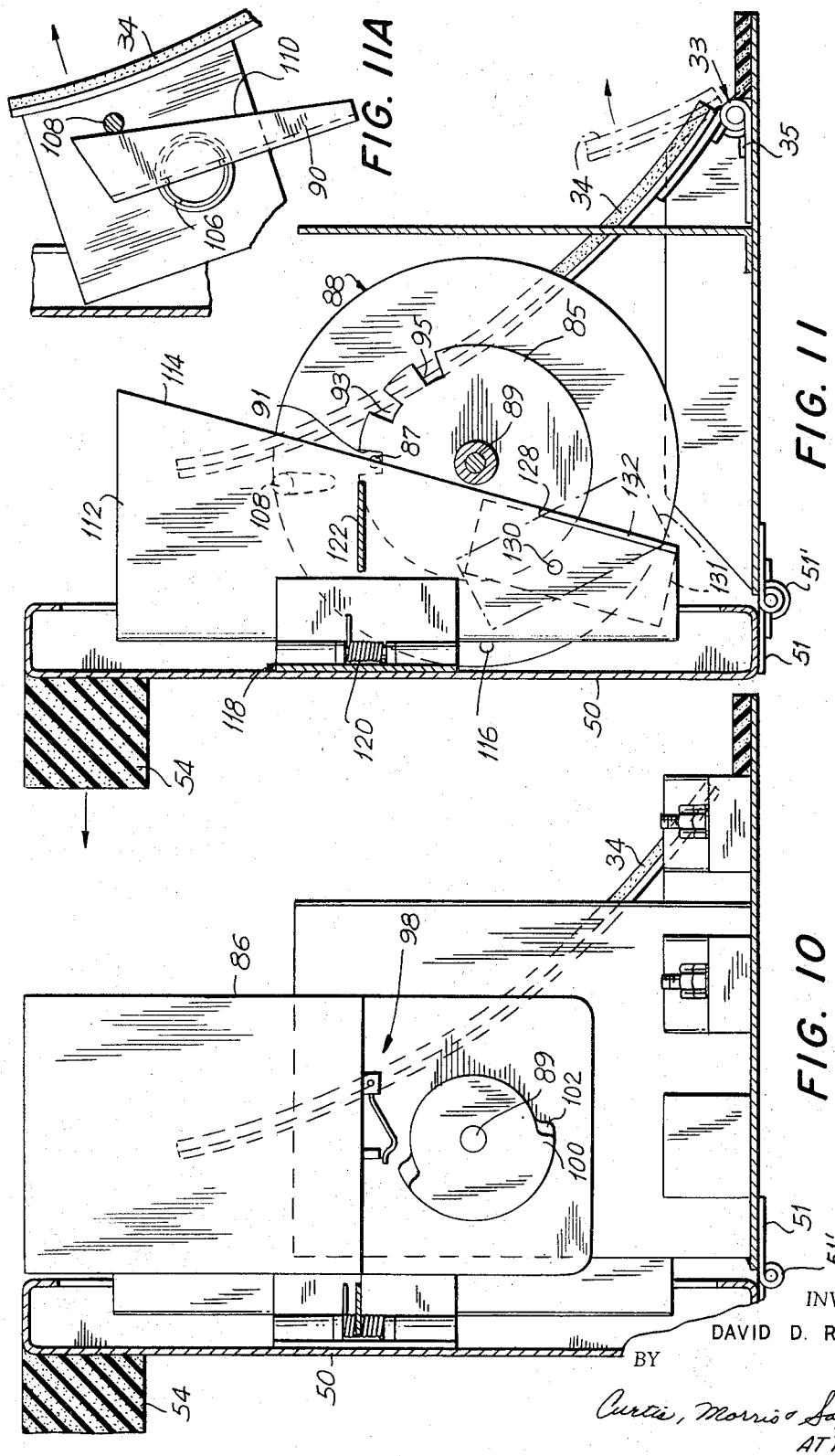

Jan. 9, 1968  D. D. RECTOR  3,362,465
AIR CONDITIONING APPARATUS INCLUDING AUTOMATICALLY
CONTROLLED DAMPER RETURN MEANS
Filed Dec. 6, 1965  10 Sheets-Sheet 8
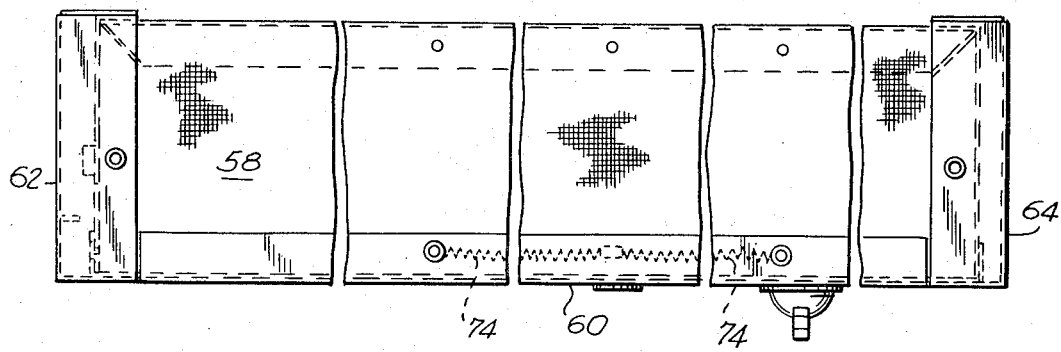
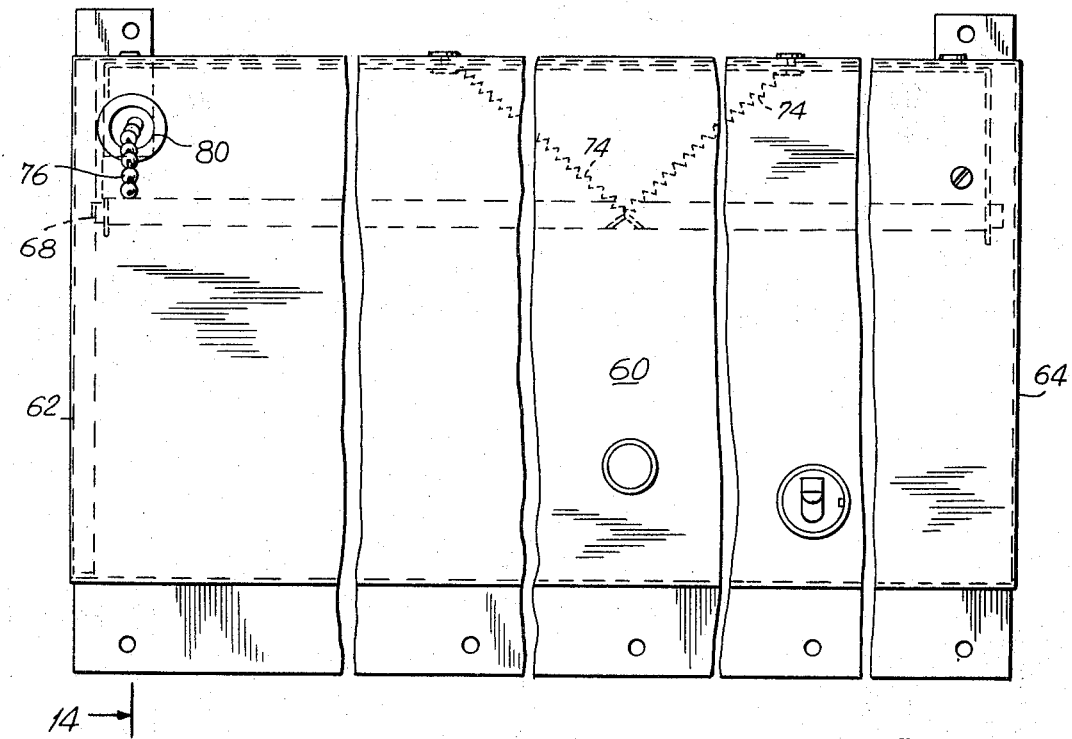
INVENTOR.
DAVID D. RECTOR
BY
Curtis, Morris & Safford
ATTORNEYS Jan. 9, 1968     D. D. RECTOR     3,362,465
AIR CONDITIONING APPARATUS INCLUDING AUTOMATICALLY
CONTROLLED DAMPER RETURN MEANS
Filed Dec. 6, 1965     10 Sheets-Sheet 9
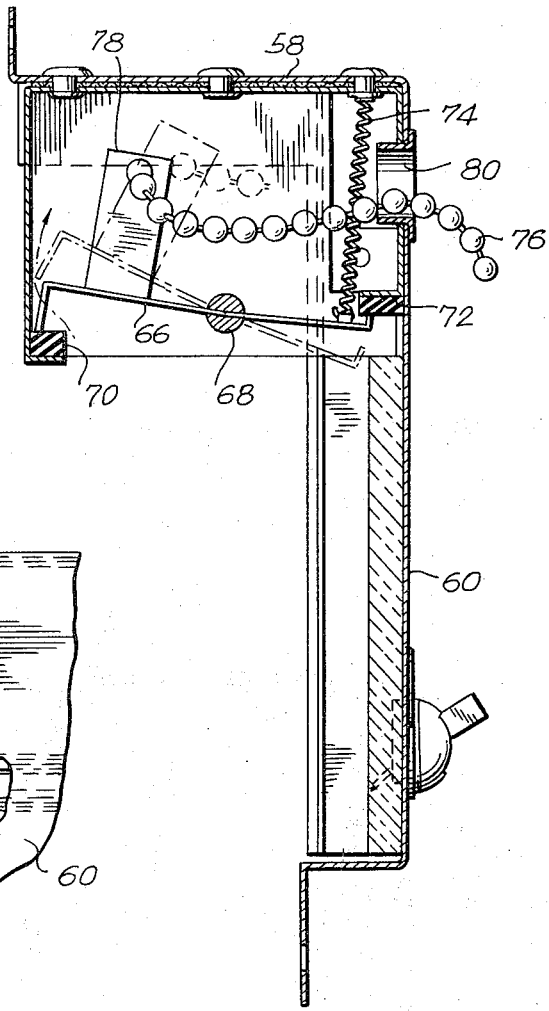
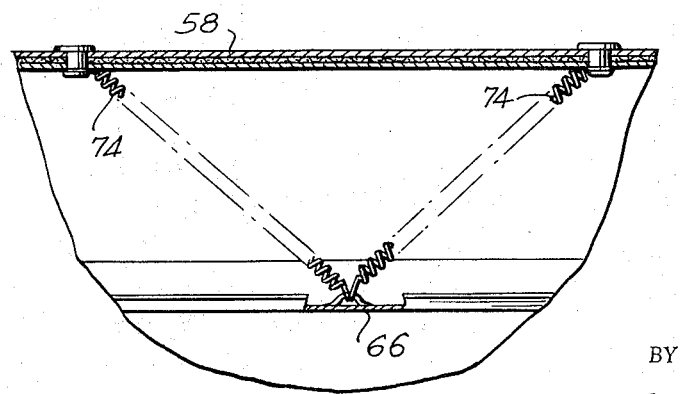
INVENTOR.
DAVID D. RECTOR
BY
ATTORNEYS

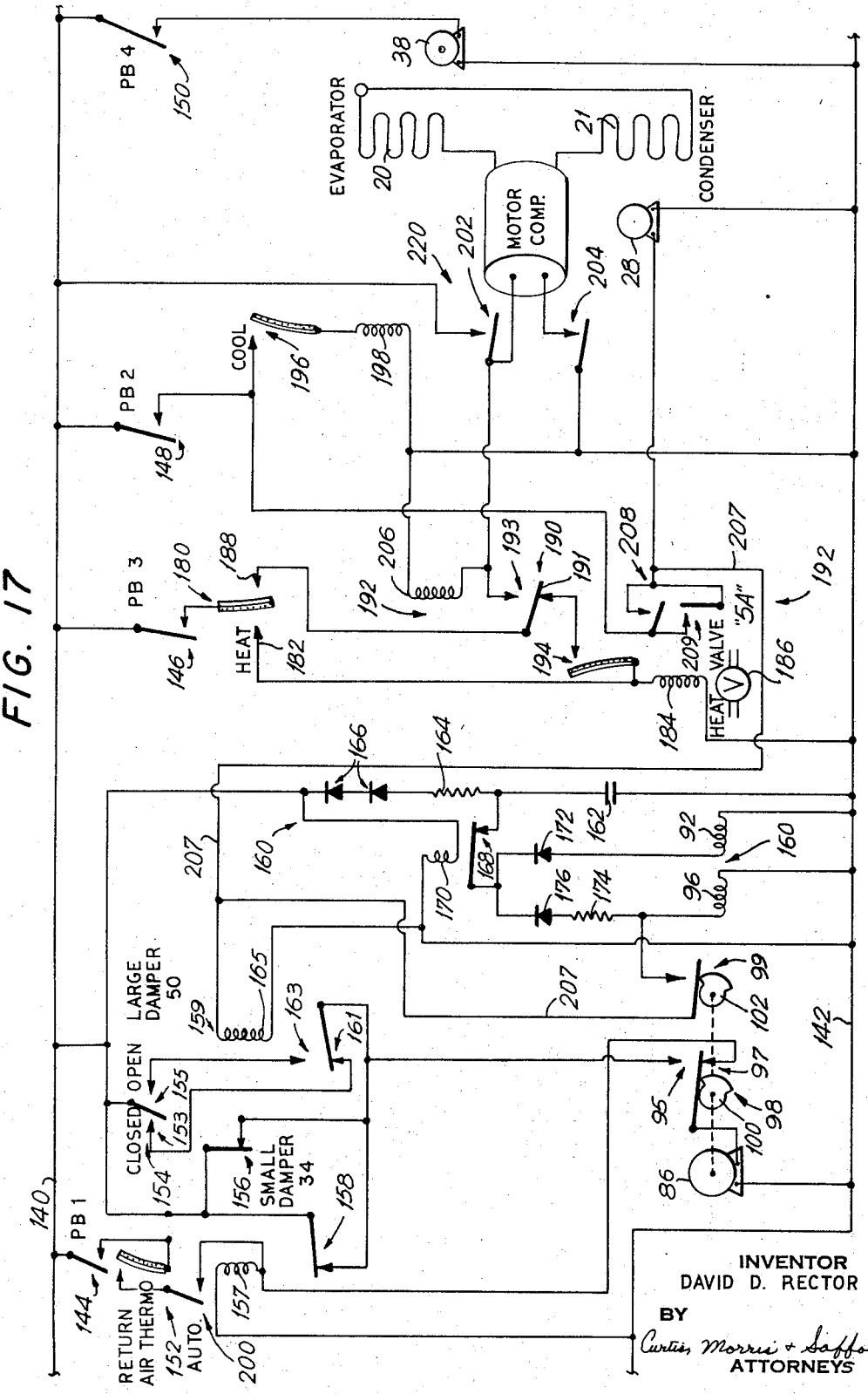

United States Patent Office 3,362,465
Patented Jan. 9, 1968

3,362,465
AIR CONDITIONING APPARATUS INCLUDING AUTOMATICALLY CONTROLLED DAMPER RETURN MEANS
David D. Rector, Ithaca, N.Y., assignor to The Singer Company, New York, N.Y., a corporation of New Jersey
Filed Dec. 6, 1965, Ser. No. 511,662
12 Claims. (Cl. 165—16)

This invention relates to air conditioning systems and to units and components for use therein, and to the control thereof.

An object of this invention is to provide air conditioning systems which produce such heating, cooling, and ventilation as is desired and in a manner which is superior to prior systems. Another object is to provide improved units for heating, cooling and ventilating rooms. A further object is to provide for the above in such a manner as to give wide choices in the modes of operation and construction and in adapting the units to the various needs and conditions in use. These and other objects will in part be obvious and in part pointed out below.

In the drawings:

FIGURE 1 is a sectional view through the outside wall of a building in which is installed an air conditioning unit which constitutes one embodiment of the invention, and with parts broken away;

FIGURE 2 is a top plan view of the unit of FIGURE 1;

FIGURE 3 is an elevation from the right-hand side of FIGURE 3;

FIGURE 9 is a top plan view of the damper operating a control assembly shown at the right in FIGURE 6;

FIGURES 10, 11 and 11A are sectional views respectively on the lines 10—10, 11—11 and 11A—11A of FIGURE 9;

FIGURE 12 is an enlarged top plan view of the sub-assembly shown at the lower right-hand portion of FIGURE 5;

FIGURE 13 is an enlarged partial-front elevation of the sub-assembly of FIGURE 12;

FIGURE 14 is a sectional view on the line 14—14 of FIGURE 13;

FIGURE 15 is an enlarged view with parts broken away of the upper left-hand portion of FIGURE 14;

FIGURE 16 is a somewhat vertical section showing the spring assembly at the upper right-hand portion of FIGURE 14; and FIGURE 17 is a schematic wiring diagram of the electrical system of the unit of FIGURES 1 to 16, with certain of the components represented to illustrate the mode of operation.

Figure 4:
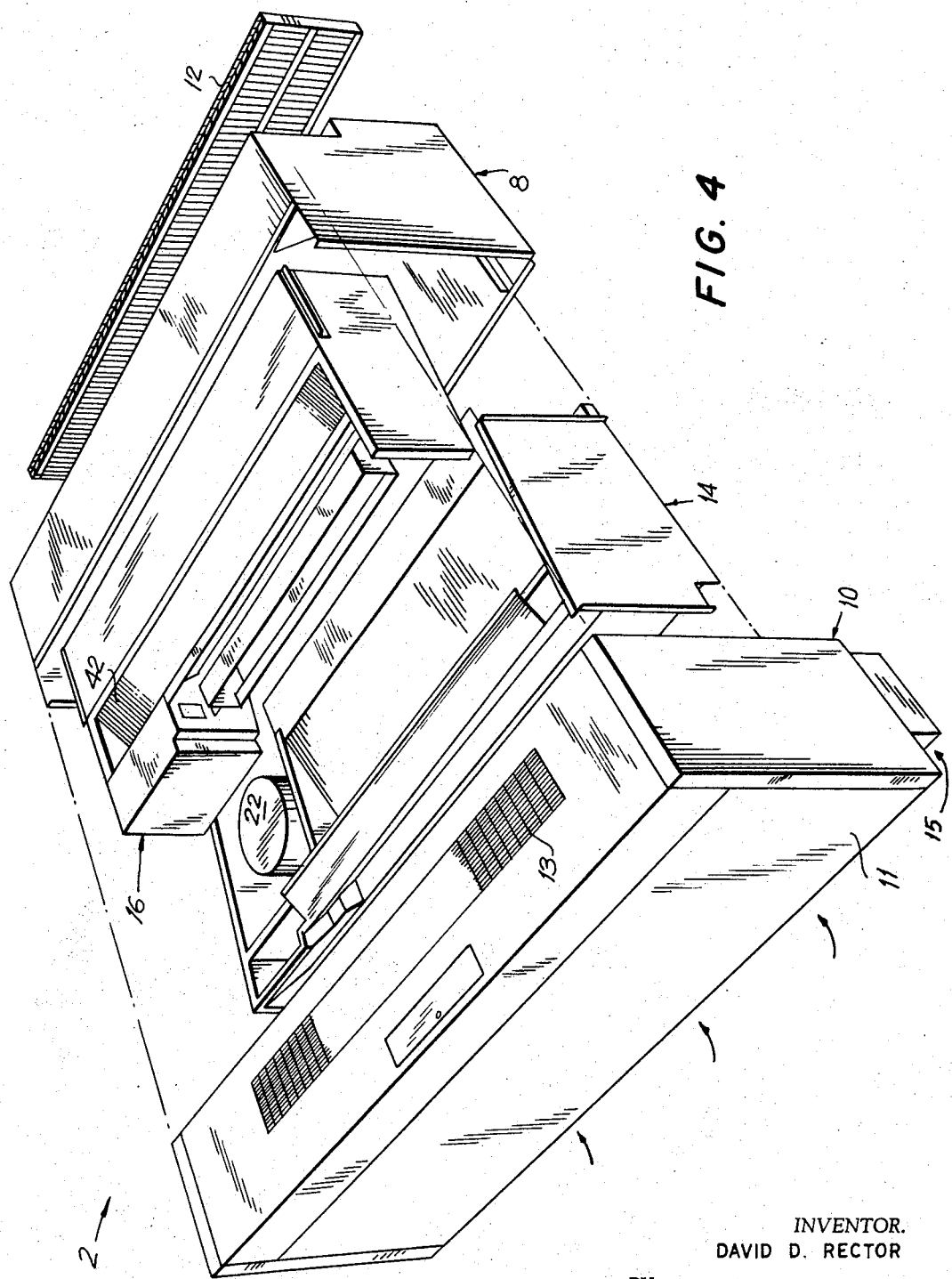
FIGURE 4 is an exploded perspective view of the unit of FIGURES 1 to 3.

Referring to FIGURE 1 of the drawings, an air conditioning unit 2 is mounted in the outside wall 4 of a building and rests upon a floor 6. As shown best in FIGURE 4, unit 2 has a wall casing 8 which is rigidly mounted in the wall, and a front casing 10 which is mounted within the room. Flush with the outer surface of wall 4 is an air intake and exhaust grill 12 through which air is drawn into and exhausted from the unit. Unit 2 also has two equipment units 14 and 16 which contain the operating equipment of the unit and are totally enclosed within the casings 8 and 10. Air is drawn into the unit beneath the bottom edge of the front wall 11 through an air inlet 15, and is discharged from the top of the unit through a grill outlet 13.

Figure 5:
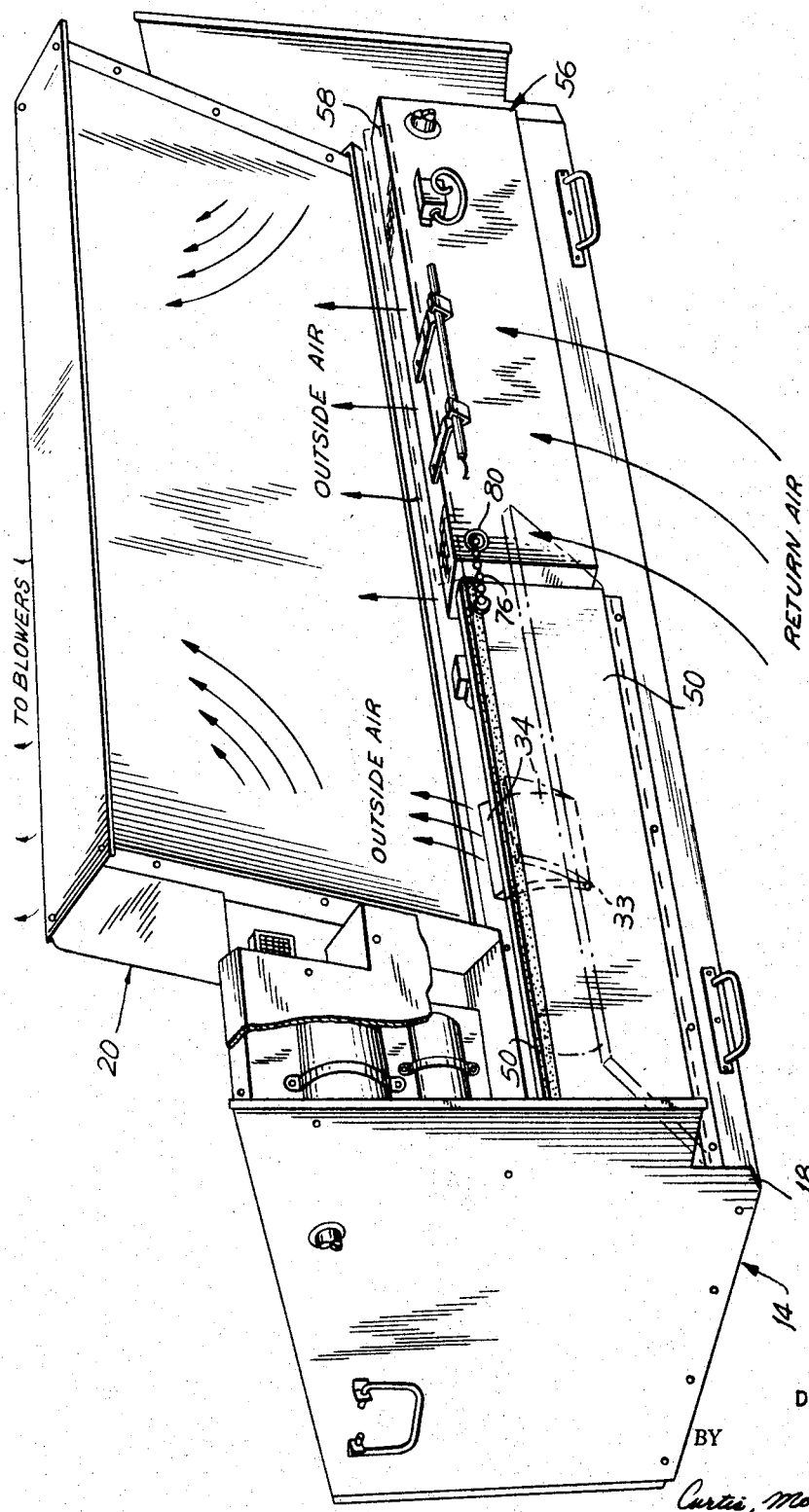
FIGURE 5 is a somewhat schematic, perspective view with parts broken away showing one of the sub-assemblies of the unit of FIGURES 1 to 4.
Figure 6:
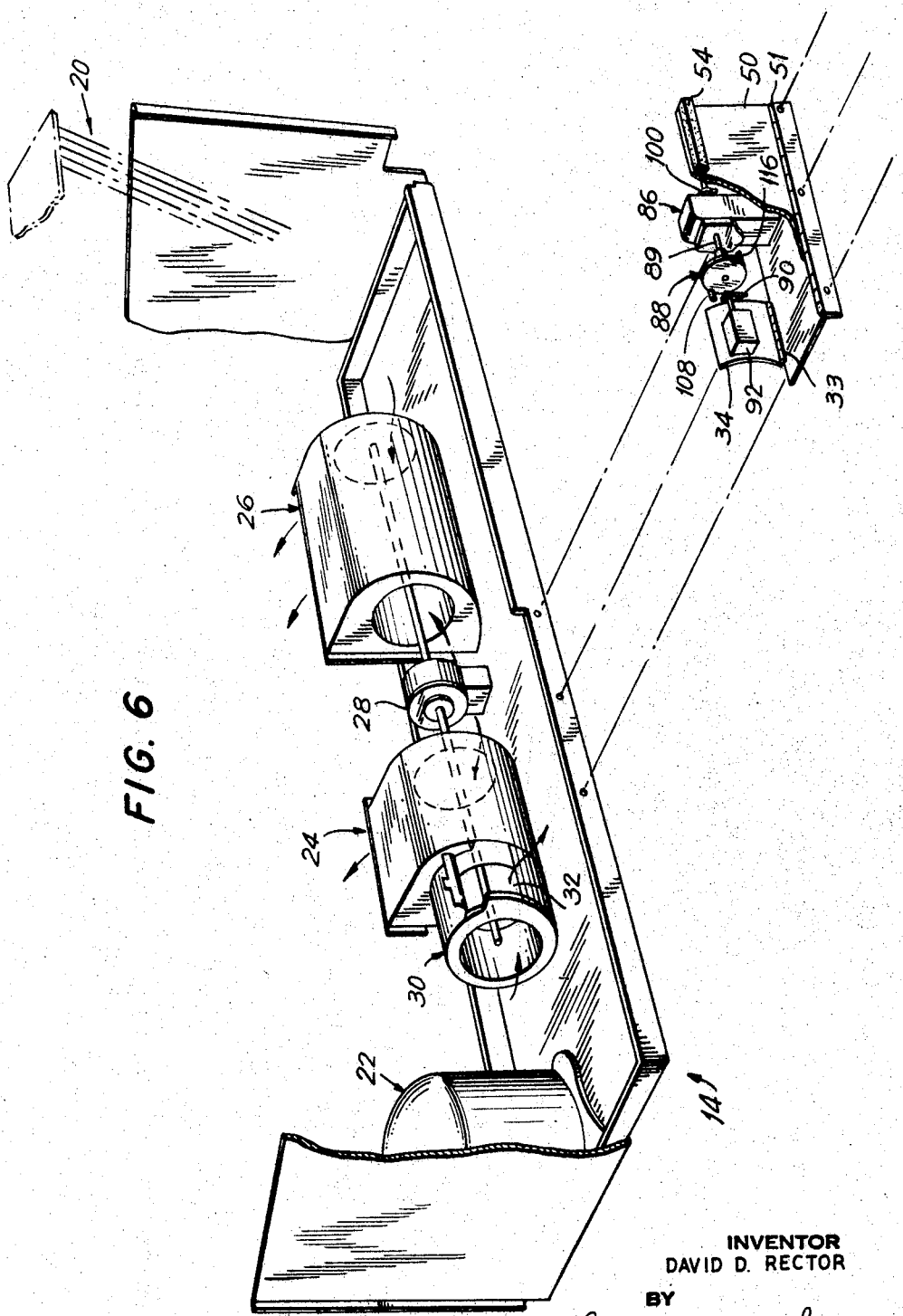
FIGURES 6 and 7 are exploded views somewhat similar to FIGURE 5 and showing other sub-assemblies.

Equipment unit 14 is shown in FIGURE 5, and a portion of the construction at the bottom of this unit is shown in FIGURE 6. Unit 14 has a shell and a frame structure 18, and mounted within it is a refrigeration system with an evaporator 20 (FIGURE 1), a condenser 21, and a compressor 22 (FIGURE 6). The refrigeration system also has an expansion capillary tube and other components forming a complete operating system for cooling and dehumidifying the air which passes through evaporator 20. The compressor and the condenser are cooled by a pair of blowers 24 and 26 (FIGURE 6) driven by an electric motor 28. Blowers 24 and 26 draw outside air in through the side portions of grill 12 and exhaust it through the condenser at the center.

At the left-hand end of blower 24, and having its motor mounted upon the same shaft, is a blower 30 which is adapted to direct a stream of the outside air through a rectangular outlet 32 (FIGURE 6) into the stream of air (FIGURE 5) which is being circulated to the room. Mounted over outlet 32 is a vent door or damper 34 which is hinged at its lower edge by a hinge 33 to swing from the closed or rest-position shown in full lines to the open position shown in broken lines. Damper 34 is urged toward its closed position by a hinge spring 35 (FIGURE 11). When damper 34 is open, outside air may pass through outlet 32 and up to the evaporator 20 along with a stream of re-circulated air from the room.

The air circulation through the evaporator and to the room results from the action of four blowers 36 (see also FIGURE 7) which are interconnected with a common axis and are driven by an electric motor 38 through a belt 40. Blowers 36 draw the air through the evaporator and discharge it upwardly through an outlet grill 13. Condensate from the evaporator is delivered to blowers 24 and 26 and is discharged with the air to assist in cooling the condenser. Hence, blowers 24, 26, and 30 cooperate to provide a positive supply of outside or fresh air and to dispose of the condensate and cool the condenser, and the air is circulated through the unit to the room by blowers 36.

As shown best in FIGURE 5, there is also a large air-restricting damper 50 which is hinged at its lower edge by a hinge 51 to swing between the vertical rest position shown in full lines in FIGURE 5 and the extended position shown there in the broken lines and in full lines in FIGURE 1. When damper 50 is in the extended position, a strip 54 of plastic foam upon its upper edge rests against the inside of the front wall 11 of the casing and blocks off the entry of re-circulated or return air through the opening 15 along the length of damper 50. Re-circulated air may still enter the unit at the right-hand side (FIGURE 5), but such entry is prevented at the left-hand side. As a result of that restriction in the supply of air, blowers 36 tend to create a negative pressure or partial vacuum condition at the entry face of evaporator 20 which assists in causing the outside air to enter through inlet 32 when damper 34 is in its open position. However, damper 50 is urged towards its full-line or rest position by a hinge spring 51, and is effective to restrict the air flow only when displaced against the action of that spring.

Positioned at the right (FIGURE 5) of damper 50 is an air inlet unit 56 which is generally rectangular with its top wall formed by a screen 58 and having an air inlet passageway (not shown) beneath evaporator 20 from the chamber of the condenser blowers. The construction of this is shown in FIGURES 12 to 16 there being a vertical front wall 60 and end walls 62 and 64. Positioned beneath screen 58 is a butterfly damper 66 which is in the form of a rectangular plate having edge flanges and mounted upon a horizontal pivot rod 68 to swing between the substantially horizontal position shown in full lines to a substantially vertical open position. When in the full line position, damper 66 rests at its edges upon foam sealing strips 70 and 72 so as to prevent the passing of air upwardly to screen 58. However, when the damper is swung clockwise as illustrated in broken lines, air may pass upwardly so that outside air may be drawn beneath the evaporator past damper 66 and out through screen 58. Hence, in addition to the outside air which may be directed into the unit when damper 34 is open, an additional quantity of air may be drawn into the unit by the negative pressure created by blowers 36, as discussed above.

Damper 66 is biased toward its closed position and a pair of coil springs 74 each of which is attached at one end to the edge of the damper and at its other end to the stationary top wall. A flexible chain 76 is attached at one end to a bracket 78 on damper 66 and extends through a grommet 80 in wall 69. Hence, butterfly damper 66 may be swung from its closed position against the action of spring 74 by pulling chain 76.

In this embodiment, the end of chain 76 is attached to damper 50 (see FIGURE 5) so that the chain is pulled and butterfly damper 66 is opened when damper 50 is swung to its fully extended position. Hence, simultaneously with the restriction of the flow of return air into the unit there is an increased flow of the outside air resulting from the opening of the butterfly damper 66.

The operating mechanism for determining the positions of damper 34 and 50 is shown in the right of FIGURE 6 and in greater detail in FIGURES 8 to 11A. This mechanism includes: an electric motor 86 having a gear reduction mechanism with a drive shaft 89; a disc 88 mounted upon drive shaft 89; a slidably movable cam plate 90, and a solenoid assembly 92, both mounted upon damper 34; and a swinging cam plate 114 of a cam assembly 94 and its operating solenoid assembly 96, both mounted upon damper 50. Beneath motor 86 there are also two cam-switches 98 and 99 having their two cams 100 and 102 mounted upon shaft 89 and connected to function as discussed below. Mounted upon shaft 89 adjacent disc 88 is a hub disc 85 which is fixed to the shaft. Disc 88 is held by an end screw onto the end of the shaft against the hub disc 85, and a pin 87 which is rigidly mounted on disc 88 projects into a selected one of three slots 91, 93 and 95 in hub disc 85. Hence, the relative angular position of disc 88 may be changed by removing the screw and moving pin 87 to another slot.

In general, motor 86 is adapted to turn shaft 89 and move disc 88 through a damper-positioning cycle wherein it moves damper 34 from its closed position to its open position, and it simultaneously swings damper 50 from its vertical position to its extended position wherein it closes the passageway between it and the outer wall of the casing. When so moved, each of the dampers is adapted to be held in a position to which it is moved by the action of its cam plate which acts as a latch. Hence, each of the dampers may be latched into its respective position against the action of its hinge spring tending to move it back to its rest position. Each of the cam plates is held in its latching position by a spring, but it may be moved from that position against the action of its spring by its solenoid. Hence, either damper may be released by energizing its solenoid, in which case the damper returns to its rest position.

As shown best in FIGURE 9 cam plate 90 has an integral mounting arm which extends to the right and is connected to the movable armature (not shown) of the solenoid assembly 92. The solenoid armature has limited movements into and out of the solenoid, and a compression spring 106 surrounds arm 104 and urges cam plate 90 to the left. Hence, when the solenoid is deenergized spring 106 moves the cam plate to the position shown in full lines. However, when the solenoid is energized its armature is drawn to the right and carries the cam to the broken line position against the action of spring 106. Disc 88 carries a pin 108 which projects to the right and is adapted to engage cam plate 90 when the cam plate is in its full line position. However, when the cam plate is withdrawn to the broken-line position, it is not engaged by the pin. When damper 34 is closed and motor 86 is operated, disc 88 rotates counter-clockwise and pin 108 first engages cam plate 90 near the lower end of its right-hand edge 110 (see FIGURE 8). As the rotation of disc 88 continues, pin 108 rides upwardly along this edge 110 and pulls cam plate 90 to the left and swings damper 34 to its open position as represented in FIGURES 10 and 11. When disc 88 reaches the position of FIGURES 10 and 11, motor 86 is stopped by the action of the cam switch 98, and damper 34 is held open. When it is desirable to close this damper, solenoid 92 may be energized so that cam plate 90 is moved to the broken-line position of FIGURE 9, thus discontinuing the latching relationship so that damper 34 is reclosed by the action of its spring.

The swinging cam plate 112 (FIGURE 11) has a cam flange 114 (FIGURE 9) which is adapted to be engaged by a cam pin 116 mounted on disc 88 and functioning in somewhat the manner of pin 108. Cam plate 112 is mounted upon the sidewall of damper 50 by a hinge 118, and it is urged counter-clockwise to its full line position (FIGURE 9) by a coil spring 120. However, an operating arm 122 is interconnected with cam plate 112 by a toe portion 124 which projects through a slot in the cam plate. Arm 122 extends to the left and is connected to the armature 126 of solenoid assembly 96 with the relationship being similar to that between arm 104 and solenoid 92. Hence, spring 120 urges cam plate 112 toward the full line position and tends to hold armature 126 to the limit of its outer movement from the solenoid. However, when the solenoid of assembly 96 is energized, armature 126 is drawn to the left into the solenoid and this movement is transmitted through arm 122 to the cam plate 112 so as to swing the cam plate to the broken-line position, and damper 50 swings to its rest position.

When disc 88 is rotated, as explained above, by the operation of motor 86 and damper 50 is in its vertical position as shown in FIGURE 11, pin 116 (FIGURE 8) moves against flange 114. Continued movement of the disc pushes cam plate 112 to the left and swings damper 50 to its extended position. When the motor stops as explained above, damper 50 is held in this extended position until motor 86 is restarted so as to rotate disc 88 to its "home" position, or until solenoid 96 is energized. The energization of solenoid 96 swings cam plate 112 to the broken-line position of FIGURE 9 so as to disengage the latching relationship between flange 114 and pin 116. This releasing of the latching relationship is accomplished by the momentary energization of the solenoid, and the cam plate is then moved back to the full line position in the relationship shown in FIGURE 11. The lower end of flange 114 is cut away so that it terminates at 128. Mounted upon the cam plate by a pin 130 is a swinging cam member 132 which forms an extension of flange 114. The cam member is adapted to swing counterclockwise. Hence, when pin 116 rides down along flange 114 and passes onto member 132 the latching relationship is maintained. However, when the elements are positioned as shown in FIGURE 11, the operation of motor 86 and the resultant rotation of disc 88 back toward its home position moves pin 116 against the left-hand side of the flange on member 132 and that swings member 132 around its pivot 130 and there is no interference with the movement of the pin. When the pin has moved past member 132, it returns to the full-line position.

In FIGURE 17 the basic electrical circuit for the air conditioning unit is represented schematically, although it should be understood that this figure is intended primarily to illustrate the mode of operation and conventional control details of the system have been omitted. Also, the temperature responsive switches have been represented as having simple bi-metallic strips, rather than the more conventional type of thermostatic controls which are used in this type of equipment and which are in fact used in the unit of FIGURES 1 to 16.

At right-hand side of FIGURE 17, the refrigeration system is represented schematically together with motors for driving the condenser blowers and the air circulation blowers. Damper motor 86 is represented at the lower left-hand portion of the figure with its switches 98 and 99 operated by cams 100 and 102. Adjacent this motor and cam assembly, there is shown the two cam-releasing solenoids 96 and 92 which are energized to release the respective cam latch mechanisms for dampers 50 and 34.

Electrical power for the system is supplied through a pair of power lines 140 and 142, and there are four manually-operated or push button control switches 144, 146, 148 and 150, each connected at one side to line 140. The other side of switch 144 is connected to a thermostat switch 152. Line 140 is also connected directly to: a double-throw switch assembly 154 which is operated by the movement of damper 50 from its vertical position to open its switch 153 and to close its switch 155; a single-pole switch 156 which is opened by the movement of damper 34 from its closed position; a normally-closed damper-motor control switch 158 which has a solenoid 157 and supplies power to motor 86; and an electrical circuit 160 for solenoids 96 and 92. A switch assembly 159 has a solenoid 165 and switches 161 and 163 connected respectively to switches 153 and 155.

Circuit 160 is formed by: a condenser 162 which is connected at one side to line 142; a condenser-charging circuit formed by a resistance unit 164 and a pair of rectifiers 166, all connected in series between switch 144 and condenser 162; a normally-closed switch 168 having a solenoid 170 which is connected between line 142 and switch 144; and a pair of solenoid circuits connected between line 142 and switch 168. One of these solenoid circuits is formed by a blocking rectifier 172 in series with solenoid 92, and the other is solenoid 96 in series with a resistance unit 174 and a blocking rectifier 176. When switch 168 is closed, it connects the solenoid circuits to condenser 162. When power is supplied to this circuit by closing of switch 144, switch 168 is held open by solenoid 170. Also, condenser 162 is then charged through the rectifier 166, and during the continued operation the condenser 162 remains charged. However, when the power is turned off, either because of the opening of the main power switch 144 or because of power failure, solenoid 170 is de-energized and switch 168 closed. The closing of switch 168 connects the charged condenser 162 to the solenoid circuits and the condenser discharges through these circuits to line 142. This discharge current flowing through the solenoid circuits produces sufficient energization of the solenoid to move their respective armatures and to release the latching relationship of dampers 34 and 50. These dampers herefore are returned to their original positions by their hinge-springs. This circuit insures that the dampers will be returned to their proper positions whenever the main power switch is open or there is a failure in the power supply. Cam switch 99 is also adapted to energize solenoid 96 during portions of the operating cycles so as to move the cam plate 112 from its damper-moving and latching position and pin 116 may move freely without moving damper 50. This prevents cam plate 112 from swinging damper 50, and releases the damper if it is open, so as to ensure that damper 50 is not open during the cooling cycle.

Figure 7:
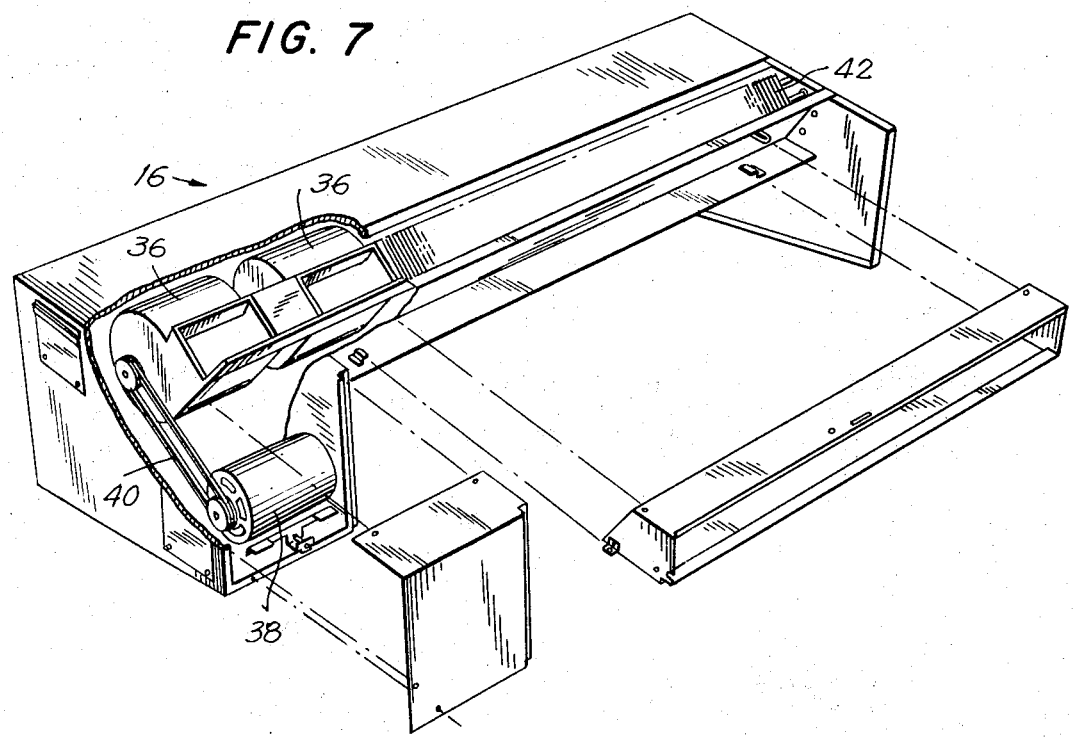
Figure 8:
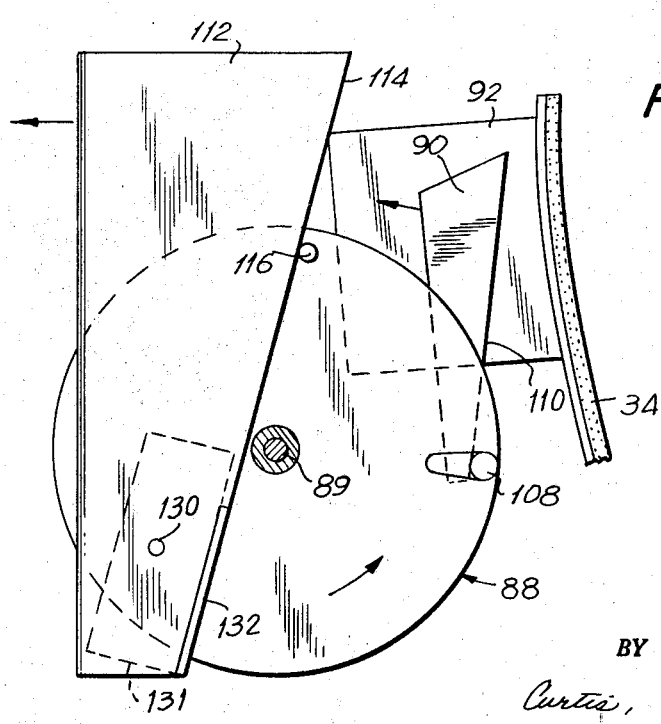
FIGURE 8 is a view of a sub-assembly.

Switch 146 is connected to a double pole thermostat switch 180 which has a contact 182 connected to a solenoid 184 of a hot water or steam "Heat" valve 186, the other side of the solenoid being connected to line 142. Valve 186 is normally closed but when open it supplies hot water or steam to coil 42 (FIGURE 7). Switch 180 also has a contact 188 which is connected through the normally closed switch 190 and a solenoid switch assembly 192 to a thermostat switch 194, the other side of which is connected to solenoid 184. Hence, during normal heating operation, the thermostat switch 180 turns on and off the hot water and steam valve through contact 182. However, when thermostat switch 180 is not calling for heating, it provides a circuit through its contact 188 to switch 190 and through that switch, if it is closed, to thermostat switch 194. Thermostat switch 194 is responsive to the discharge air temperature and it is closed if that air falls below a predetermined temperature such as 55° F. Under such circumstances hot water of steam is supplied to the heating coil even though the return air temperature is not low enough to cause thermostat switch 180 to call for heating.

Switch 148 is connected at one side to a thermostat switch 196, the other side of which is connected to the solenoid 198 of a compressor switch assembly 220. Switch assembly 220 includes a switch 202 which is closed to connect one side of the compressor motor to line 140, and a switch 204 which is closed to connect the other side of the compressor motor to line 142. The closing of switch 202 also connects line 140 to one side of a solenoid 206 of switch assembly 192, the other side of the solenoid being connected to line 142. The energization of solenoid 206 lifts the armature of switch 190 so as to prevent the completion of a circuit through thermostat switch 194 to solenoid 184 of valve 186. The rising of this armature also completes a holding circuit for solenoid 206 which keeps this solenoid energized as long as switch 146 is closed and thermostat 180 engages its contact 188.

Switch assembly 192 also has a normally open switch 208 which is closed to connect the condenser blower motor 28 through switch 148 to line 140. The other side of motor 28 is connected to line 142. Hence, the condenser blowers are operated whenever switches 148 and 208 are closed. Connected in parallel with switch 208 is a normally open manual switch 209 which may be closed during the cooling operation (switch 148 being closed) to maintain the continuous operation of the condenser blower motor 28, even when solenoid 206 is de-energized. Motor 38 for the air circulation blowers 36 is connected at one side to line 142 and at the other side to switch 150 so that these blowers operate continuously when switch 150 is closed. During the cooling operation switches 144, 148, and 150 are closed and switch 146 is open. During the heating operation switches 144, 146 and 150 are closed and switch 148 is open. If the unit is to be operated with fully automatic control of heating and cooling, all of these switches are closed, and a switch 200 is also closed which is in series with thermostatic switch 152. Switch 152 is responsive to the temperature of the return air so as to close upon a rise in temperature, e.g. above 68° F. and to open upon a drop below 64.5° F. Hence, when switches 144 and 200 are closed and the temperature rises, the circuit is completed by the closing of switch 152 to energize solenoid 157 and open switch 158. A circuit is also completed from switch 200 to the lower switch 97 of cam switch 98.

When the operation is first started under fully automatic control, the dampers are in their "rest" positions and a circuit is completed to motor 86 through switches 144, 152 and 200 and thence through switch 97, so that the damper motor starts to operate. Cam 100 opens switch 97 and closes switch 95. The opening of switch 97 breaks the circuit to motor 86, but the closing of switch 95 completes a circuit to motor 86 through switches 156 and 95. The operation of motor 86 opens damper 34 and that opens switch 156 so that motor 86 stops with damper 34 open. During the heating operation, motor 86 also moves damper 50 to its extended position so as to restrict the flow of return air to the unit. At that time the condenser blower motor 28 is not operating, but the opening of damper 34 permits outside air to enter and the butterfly damper 66 is also held in its open position by damper 50 so that additional outside air enters at 58. Switch 158 is also open and solenoid 165 is not energized so that switch 163 is open. Therefore, motor 86 remains deenergized when it completes its damper-opening function. It is assumed that the return air temperature is sufficiently low to close switch 182 so as to open valve 186. However, if the discharge air temperature drops below a predetermined minimum, switch 194 completes a circuit through switches 190 and 188 which opens valve 186, even though the return air temperature does not require heating.

When the return air temperature requires cooling, switch 196 closes and that energizes solenoid 198 and closes the compressor motor switches 202 and 204. The closing of switch 202 also energizes solenoid 206 so as to close switch 208 and that starts the condenser blower motor 28. The energization of solenoid 206 also closes switch 193 which provides a lock-in circuit for solenoid 206 through switches 188 and 146. This lock-in circuit is broken if the temperature of the return air drops sufficiently to open switch 188. Otherwise, condenser blower motor 28 continue to operate the blowers even through the compressor is stopped.

It has been explained above that the electric condenser 162 may be discharged through solenoids 92 and 96 to release the damper latch mechanisms whenever power is cut off. Damper 34 is open both for heating and cooling. During cooling, fan 30 directs air into the unit, and, during heating, air is drawn into the unit through inlet 32 by fans 36, while damper 50 restricts the flow of return air to unit. However, during the cooling operation it is desirable for damper 50 to remain in its vertical position so that it does not block the re-circulation of air. Accordingly, switch 208 is connected through a line 207 to switch 99 so that when motor 28 is operating and switch 99 is closed by its cam 102, a circuit is completed to solenoid 96. Completion of that circuit swings cam plate 112 away from pin 116 so that damper 50 is returned to its vertical or "home" position. Therefore, damper 50 does not interfere with the free flow of air from the room into the unit and the butterfly damper 66 remains closed.

It has been indicated above that switch 146 is not closed when the unit is set for cooling only, rather than for fully automatic heating and cooling. Accordingly, switch 209, which is in parallel with switch 208, is closed manually along with switches 144, 148 and 150 when the unit is operating on cooling only. Line 207 extends to solenoid 165 so as to energize this solenoid and close switch 163 and open switch 161. Switch 163 is in series with switch 155 which is closed only when damper 50 is in its extended or "open" position. However, when the unit starts the cooling operation damper 50 is released by the energization of solenoid 96 and returns to its "home" position so that switch 155 is opened. Hence, damper motor 86 starts its damper-operating cycle only when damper 34 is closed, and during the cycle damper 34 is opened. Switch 99 completes the circuit discussed above to solenoid 96 so as to release damper 50. When cooling is discontinued by the opening of switch 152, or switch 144 or both, switch 158 is reclosed. Normally, at that time motor 86 has moved cams 100 and 102 so as to open switch 97 and close switches 95 and 99. Hence, the closing of switch 158 completes a circuit through switches 158 and 95 to restart motor 86 and thereby return the motor to the "home" position wherein switches 95 and 99 are open and switch 97 is closed. Also, the damper-opening disc 88 is returned to the "home" position wherein pins 108 and 116 are out of engagement with their damper-opening cams. Hence, damper 34 is reclosed and damper 50 is in its vertical position, and motor 86 is deenergized by the opening of switch 95.

It is thus seen that the unit can be operated to switch automatically between heating and cooling operations. When heating is started, the dampers remain "closed" during the "warm up" period and they are then opened as is desirable. The system will operate during the heating cycle to utilize outside air to provide cooling when that is sufficient to satisfy the needs.

In the illustrative embodiment, hot water or steam heat is provided. In certain units, instead of hot water or steam, electric strip heaters were used and controls were provided for sequential turning on of the heater elements, and safety means prevented over-heating. When two or more of the units are operated in a single room, the master control is by a single control system of the type of FIGURE 17, and each "slave" unit has an abbreviated control system connected to the master control. In each of the slave units: Switch 144 is replaced by a relay switch which is closed only when motor 38 is operated; switches 148 and 196 are replaced by a relay switch which is closed only when line 207 is energized; solenoid 184 is energized only when the same solenoid of the master unit is energized; and, other appropriate changes are made.

I claim:
1. An air conditioning apparatus, the combination of, means for forming an air treating path from an air inlet and mixing zone to an air outlet, circulating means to direct a stream of air from said air inlet and mixing zone along said path and from said air outlet, means for treating said stream of air, means providing separate air inlets to said air inlet and mixing zone for recirculated air and for outside air, damper means for controlling the relative amounts of recirculated air and return air passing to said air inlet and mixing zone, electric motor means to move said damper means from an initial condition to selected extended conditions thereby to provide a selected ratio of the relative amounts of recirculated air and outside air, return means to return said damper means to said initial condition, activating means to initiate the action of said return means and comprising solenoid means and condenser means, and control means to charge said condenser means whenever said electric motor means is energized and to discharge said condenser means through said solenoid means upon deenergization of said electric motor means.

2. Apparatus as described in claim 1, wherein said damper means includes an outside air damper which is opened by said electric motor means and which has spring means comprising said return means, and latch means to hold said outside air damper in its open position and adapted to be released by said activating means.

3. Apparatus as described in claim 1, wherein said damper means includes a restricting damper positioned to move from an initial condition wherein it is inoperative to an extended condition it restricts the entry of return air to said air inlet and mixing zone.

4. Apparatus as described in claim 3 which includes a butterfly damper having spring means urging it to its closed position, flexible means connecting said butterfly damper to said restricting damper so as to be opened by the movement of said restricting damper to the extended condition, and means providing an outside air passageway past said butterfly damper to said zone.

5. Apparatus as described in claim 1 wherein said electric motor means comprises an electric motor and gear drive and a rotary disc driven thereby and having pins thereon, and moveable cam plates which are adapted to engage with said pins.

6. Apparatus as described in claim 5 wherein each of said cam plates is mounted to swing to and from engagement with one said pins to form a latch, and wherein said solenoid means comprises a plurality of solenoid units each of which has an armature which is connected to one of said cam plates.

7. Apparatus as described in claim 6 wherein said means for treating said air includes a refrigeration system having an evaporator in said path adjacent the air discharge outlet.

8. Apparatus as described in claim 6 wherein said means for treating said air includes air heating means in said path adjacent the air discharge outlet.

9. Apparatus as described in claim 6 wherein said means for treating said air includes air heating and cooling means in said path, and electric control means to control the operation whereby the air may be heated or cooled or may be circulated with neither heating nor cooling.

10. In air conditioning apparatus of the character described, the combination of, a cabinet structure having a first air inlet for outside air and a second air inlet for re-circulated air and an air outlet, a refrigeration system within said cabinet having a condenser positioned to be cooled by outside air and an evaporator to cool air passing to said air outlet, a first damper which is adapted to be opened to permit outside air to flow from said first air inlet through said cabinet to said air outlet, a second damper which is adapted to be moved to an air restricting position wherein it restricts the entry of re-circulated air to said cabinet, damper-control means which is adapted to move through a damper opening cycle whereby it opens both of said dampers, releasable means providing separate connections between said dampers and said damper-control means whereby either of said dampers may be positioned independently of the position of the other, solenoid means to control said releasable means, and an electric circuit to control the energization of said solenoid means and including a condenser which is charged during the initial operation of said damper-control means and which is discharged through said solenoid means when electric power is disconnected from said condenser.

11. Apparatus as described in claim 10 wherein said electric circuit includes means to return said damper-control means to a "home" position upon the completion of an operation wherein the air is cooled.

12. In an air conditioning unit which may be mounted in the outside wall of a building substantially at the floor level to condition the air within a space, the combination of, a cabinet structure having a first air inlet opening for receiving outside air through the building wall and a plenum chamber through which the outside air passes from said first air inlet, said cabinet structure having a second air inlet for recirculated air from the space, said cabinet structure having a conditioned air outlet in its top portion through which air is discharged to the space, a refrigeration system within said cabinet having a condenser positioned adjacent said first air inlet, said refrigeration system also having an evaporator positioned upstream from said air outlet to cool air passing to said conditioned air outlet, said cabinet structure including a dividing wall structure separating said plenum chamber from the stream of air flowing from said second air inlet, means forming a conditioning air passageway from said second air inlet and said damper opening through said evaporator to said conditioned air outlet, said dividing wall structure having a damper opening and a first damper which is adapted to move between a closed position wherein it closes said damper opening and an open damper position wherein air may flow through said damper opening, fresh air blower means positioned within said plenum chamber and adapted to draw air in through said first air inlet and to discharge some of the air through said damper opening and to discharge the remainder of the air through an air outlet after passing through said condenser, a second blower means to flow a stream of air along said passageway to said conditioned air outlet, a second damper which is adapted to be moved to an air restricting position wherein it restricts the entry of recirculated air to said cabinet structure, damper-control means which is adapted to move through a damper-operating cycle whereby it opens and closes both of said dampers and providing separate control whereby either of said dampers may be positioned independently of the position of the other, and an electric circuit to control the operation of said damper-control means.

References Cited

UNITED STATES PATENTS

| | | | |
|---|---|---|---|
| 2,206,445 | 7/1940 | Beeler | 165—16 XR |
| 2,243,647 | 5/1941 | Otto | 165—16 X |
| 2,315,517 | 3/1943 | Greenlee et al. | 165—16 |
| 2,407,036 | 9/1946 | Snavely | 165—16 X |
| 3,051,451 | 8/1962 | Bierwirth et al. | 165—16 X |

ROBERT A. O'LEARY, *Primary Examiner.*

M. A. ANTONAKAS, *Assistant Examiner.*